(12) United States Patent
Mutsuno et al.

(10) Patent No.: US 7,272,793 B2
(45) Date of Patent: Sep. 18, 2007

(54) INFORMATION PROCESSING DEVICE AND METHOD

(75) Inventors: Masahiro Mutsuno, Ohta-ku (JP); Yasuhiro Komori, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 10/688,426

(22) Filed: Oct. 16, 2003

(65) Prior Publication Data

US 2004/0088273 A1 May 6, 2004

(30) Foreign Application Priority Data

Oct. 21, 2002 (JP) ............................. 2002/305831

(51) Int. Cl.
 *G06F 3/00* (2006.01)
(52) U.S. Cl. ....................... 715/707; 715/705; 715/866
(58) Field of Classification Search ................ 715/705, 715/707, 866; 434/365, 350
 See application file for complete search history.

(56) References Cited

U.S. PATENT DOCUMENTS 5,513,308 A * 4/1996 Mori ........................... 715/707
5,535,321 A * 7/1996 Massaro et al. ............. 715/707
5,727,950 A * 3/1998 Cook et al. .................. 434/350
5,774,118 A * 6/1998 Hatakama .................... 715/707
2001/0033294 A1* 10/2001 Asch et al. ................... 345/705

FOREIGN PATENT DOCUMENTS

JP     8-44520 A     2/1996

* cited by examiner

*Primary Examiner*—Kieu D. Vu

(57) ABSTRACT

An information processing device according to the present invention is included in an information processing apparatus and outputs guidance information for an operation performed for the information processing apparatus by a user. In the information processing device, a user information acquisition unit identifies a user who is operating the information processing device, and an input control unit identifies the type of operation performed by the user. The information processing device also includes an operation history database for storing operation history information unique to the user and a voice guidance database for storing at least one piece of guidance information on the operation. A guidance selection unit selects appropriate guidance information on the basis of the operation history information on the operation unique to the user, and a voice output unit outputs the selected guidance information.

16 Claims, 6 Drawing Sheets

INFORMATION PROCESSING DEVICE AND METHOD

BACKGROUND OF THE INVENTION

1. Field of the Invention

The present invention relates to an information processing device and an information processing method for performing voice guidance in an information processing apparatus, such as a personal computer, facsimile machine, or a copying machine, provided with a multifunctional user interface.

2. Description of the Related Art

Recently, information processing apparatuses, such as personal computers, facsimile machines, and copying machines, have been provided with more various and more complicated functions. Thus, it is very difficult for general users to remember such complicated functions to use them efficiently. Since there are some unfamiliar functions that are not used by users who are familiar with the apparatuses, even the users who are familiar with the apparatuses may need guidance, such as explanations for the unfamiliar functions. Thus, apparatuses, which are typified by copying machines and the like, providing operational guidance by voice or the like so that users can efficiently perform various operations are commonly known. For example, an interactive device that is disclosed, for example, in Japanese Patent Laid-Open No. 8-44520 is known in which operational ability of a user is determined from time spent for input operations and guidance for general users is changed in accordance with the user's operational ability.

However, in the known interactive device mentioned above, input operations during interactive processing are determined in order to determine appropriate guidance. Thus, appropriate guidance is determined only from interactive operations, which are performed after listening to operational guidance. Therefore, when users who often use the apparatuses use an unfamiliar function, their knowledge is almost equal to the knowledge of users who are unfamiliar with the apparatuses. Also, for guidance for an operation whose procedures are not specified, guidance desired by users may not be output. Moreover, for an apparatus, such as a copying machine, it is useless for users who have knowledge about troubleshooting for a paper jam or the like to listen to guidance for this kind of troubleshooting many times. In contrast, users who have little knowledge about the troubleshooting need appropriate guidance.

SUMMARY OF THE INVENTION

The present invention is designed with respect to the circumstances described above, and the object of the present invention is to provide an information processing device and an information processing method in an information processing apparatus in which appropriate voice guidance is selected in accordance with operation history unique to a user and the user's knowledge about the apparatus and in which such voice guidance is output from the single apparatus.

An information processing device according to the present invention is included in an information processing apparatus and outputs guidance information for an operation performed for the information processing apparatus by a user. The information processing device includes a history information storing unit that stores operation history information unique to the user; an operation identification unit for identifying the type of operation performed by the user; a guidance information storing unit for storing at least one piece of guidance information on the operation; a selection unit for selecting appropriate guidance information from the guidance information storing unit on the basis of the operation history information on the operation unique to the user; and an output unit for outputting the selected guidance information.

Further objects, features and advantages of the present invention will become apparent from the following description of the preferred embodiments with reference to the attached drawings.

DESCRIPTION OF THE PREFERRED EMBODIMENTS

Embodiments of the present invention will be described with reference to the drawings.

First Embodiment

Figure 1:
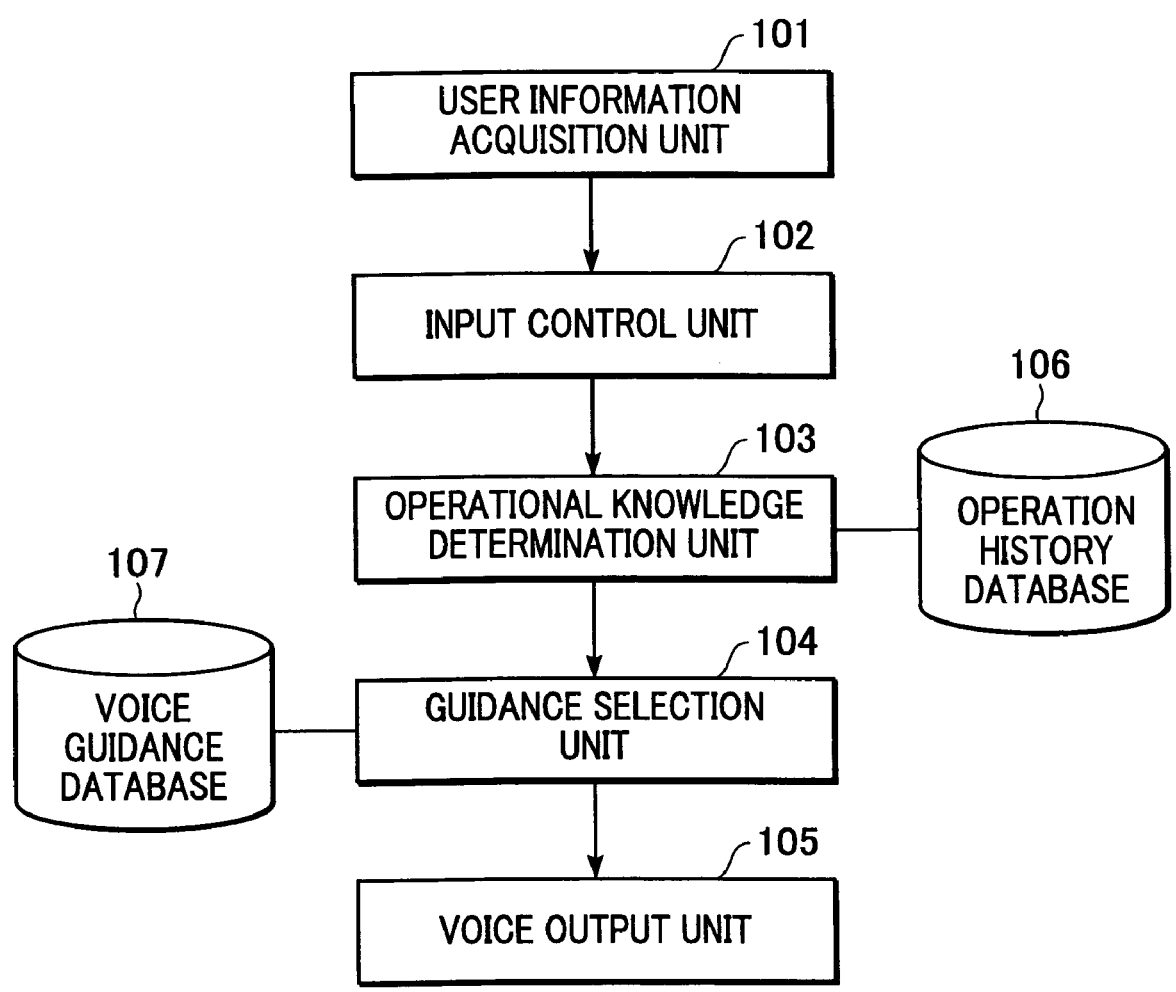
FIG. 1 is a block diagram of the structure of a voice guidance device according to a first embodiment of the present invention.

FIG. 1 is a block diagram of the structure of a voice guidance device according to a first embodiment of the present invention. Referring to FIG. 1, the voice guidance device according to the first embodiment includes a user information acquisition unit 101 for acquiring user information, such as a user ID, and for determining which user is operating the voice guidance device; an input control unit 102 for detecting the type of operation (for example, a button press) performed by the user; an operation history database 106 for storing operation history information for a plurality of users; an operational knowledge determination unit 103 for determining operation history information and operational knowledge of the user on the basis of the detected user's operational information by referring to the operation history database 106; a voice guidance database 107 for storing a plurality of pieces of voice guidance information for each piece of operational information; a guidance selection unit 104 for selecting appropriate voice guidance information from the voice guidance database 107 on the basis of the determined user's operational knowledge; and a voice output unit 105 for outputting the selected voice guidance.

Figure 2:
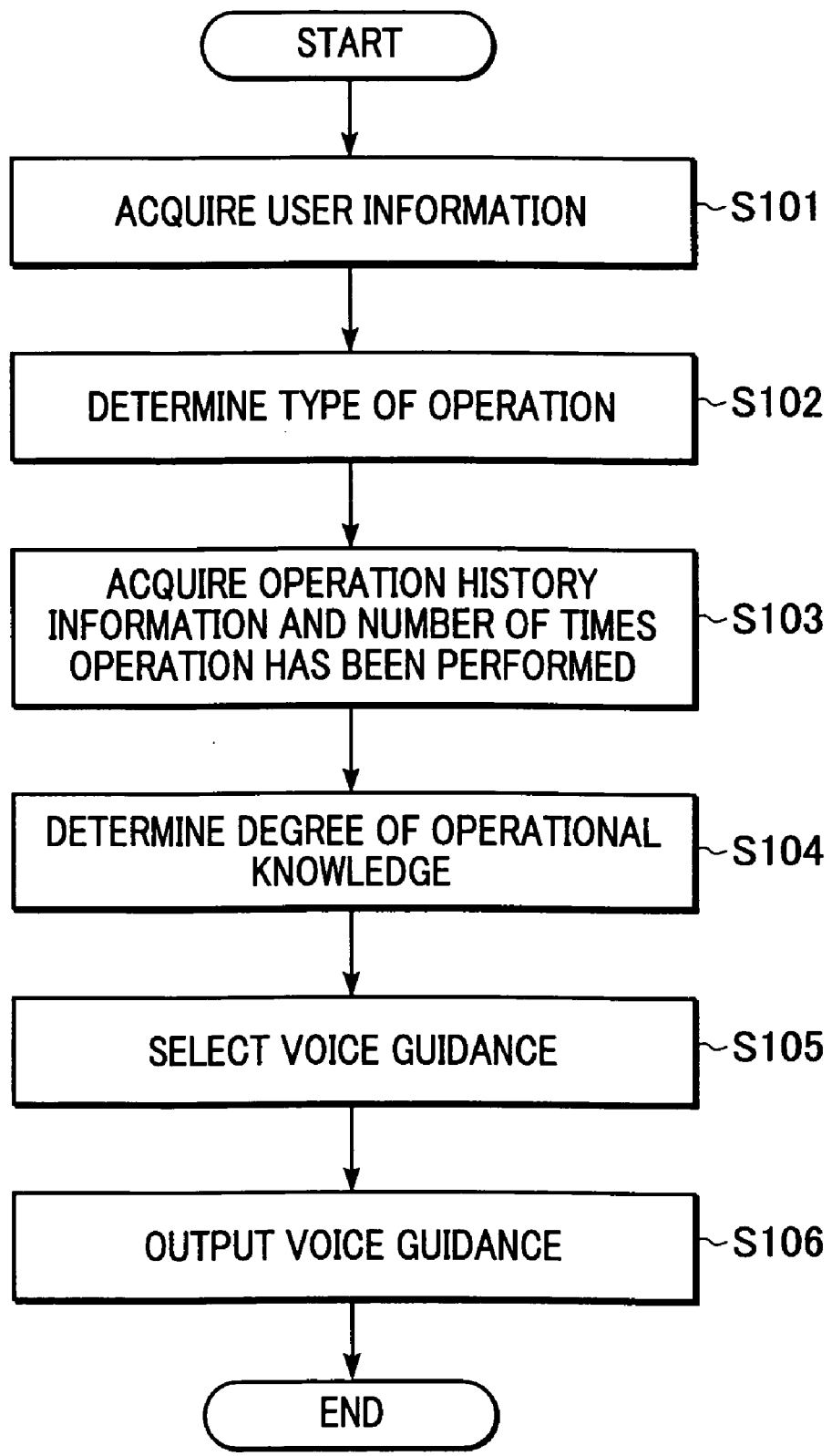
FIG. 2 is a flowchart for explaining the operational procedures performed in the voice guidance device according to the first embodiment of the present invention.

The operational procedures performed in the voice guidance device according to the first embodiment will now be described with reference to a flowchart shown in FIG. 2. A user inputs user information to an apparatus that includes the voice guidance device. Accordingly, the voice guidance device acquires the user information by the user information acquisition unit 101 (step S101). The user information includes a user ID and the like, and such information allows the user to be identified.

When the identified user performs an operation, the type of operation is determined by the input control unit 102 (step S102). The type of operation determined by the input control unit 102 is transmitted to the operational knowledge determination unit 103. The operational knowledge determination unit 103 refers to the operation history database 106 to acquire operation history information, e.g. the number of times the operation has been performed, of the identified user on the basis of the user information (step S103).

The operational knowledge determination unit 103 determines the degree of the user's knowledge about the operation (step S104), and transmits the results to the guidance selection unit 104. The guidance selection unit 104 selects voice guidance information appropriate for the user by referring to the voice guidance database 107 on the basis of the information transmitted from the operational knowledge determination unit 103 (step S105). The voice output unit 105 outputs the voice guidance information transmitted from the guidance selection unit 104 (step S106).

In other words, the information processing device (voice guidance device) according to the present invention outputs guidance information for an operation performed for an information processing apparatus by a user. Thus, the information processing device includes the user information acquisition unit 101 for identifying the user who is operating the information processing device, the operation history database 106 for storing operation history information unique to the user, the input control unit 102 for identifying the type of operation performed by the user, the voice guidance database 107 for storing at least one piece of guidance information on the operation, the guidance selection unit 104 for selecting appropriate guidance information on the basis of the operation history information on the operation unique to the user, and the voice output unit 105 for outputting the selected guidance information.

Also, the information processing device according to the present invention further includes the operational knowledge determination unit 103 for determining the degree of the user's knowledge about the operation on the basis of the operation history information of the user, and the guidance selection unit 104 selects appropriate guidance information from the voice guidance database 107 on the basis of the results determined by the operational knowledge determination unit 103.

The specific operational procedures according to the first embodiment will now be described by way of example of a copying machine.

After the user presses a button to acquire a user ID, guidance for inputting user information is displayed on a touch panel or the like. The input of the user ID and the like by the user using the button or the like allows the copying machine to identify the user. Then, the copying machine displays a special screen for the identified user on the touch panel. Also, the copying machine designates operation history of the identified user.

The user presses any button on the touch panel. Here, for example, the user presses a "double-sided copy" button. The copying machine then searches for history information of the user on the "double-sided copy" button from the operation history database 106. The operation history database 106 holds time information on the point in time at which the "double-sided copy" button is pressed, and the number of times this button has been pressed is increased by one. Then, the history information is acquired from the operation history database 106. The information acquired from the operation history database 106 includes the use history (time information) and the number of times the button has been pressed (the number of presses). The necessity of the guidance for the "double-sided copy" button press operation by the user is determined on the basis of such information.

Figure 3:
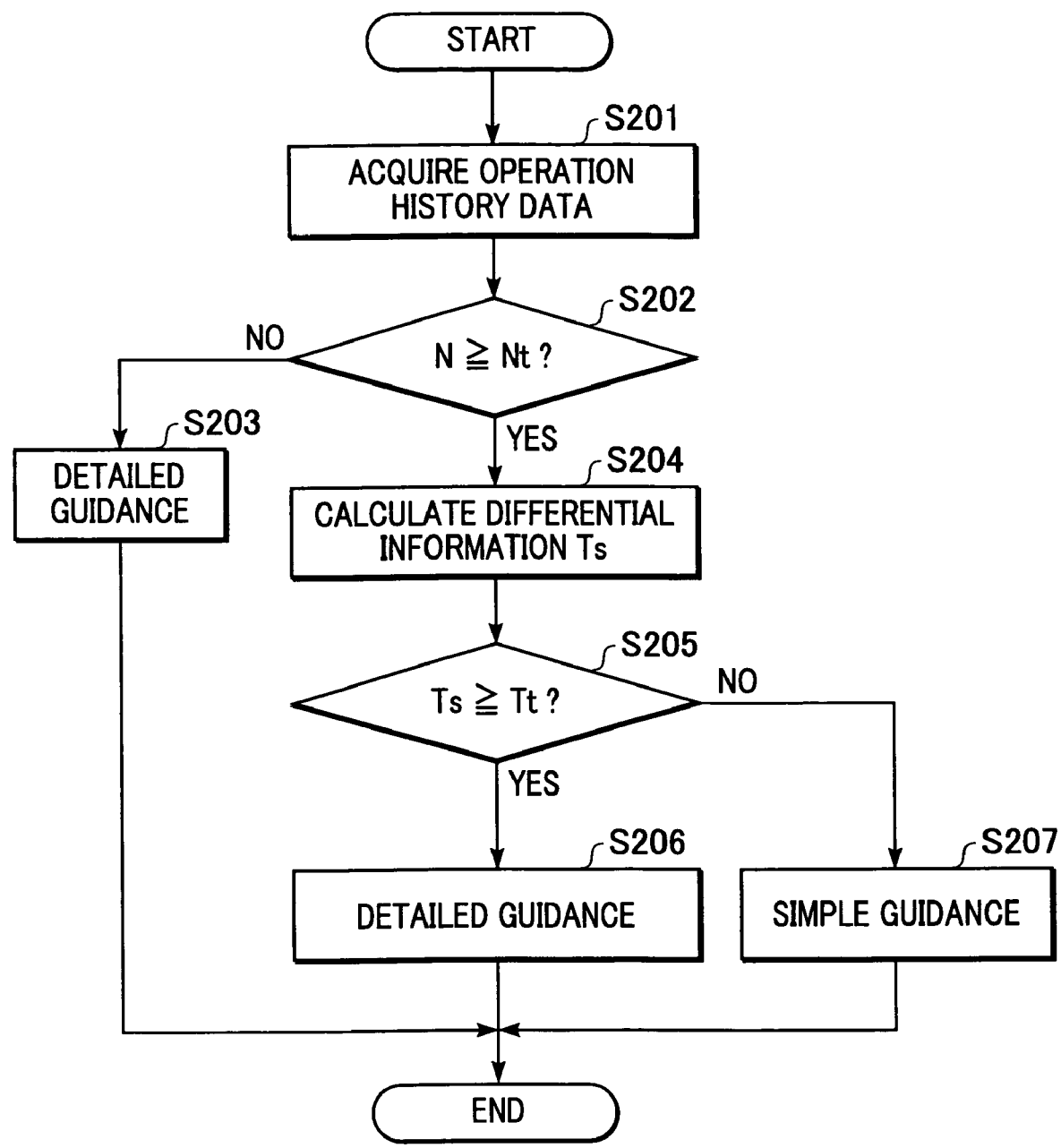
FIG. 3 is a flowchart for explaining a process of a guidance determination method according to the first embodiment of the present invention.

A process of a guidance determination method according to the first embodiment will now be described with reference to a flowchart shown in FIG. 3. Operation history information is acquired (step S201). Since the number N of times the user has operated the "double-sided copy" button is known in step S201, it is determined whether or not the number N of times the user has performed the operation is greater than or equal to an operation threshold number Nt (step S202). If the number N of times the user has performed the operation is less than the operation threshold number Nt (if the determination in step S202 is negative), it is determined that detailed guidance for the operation is necessary (step S203).

If the number N of times the user has performed the operation is greater than or equal to the operation threshold number Nt (if the determination in step S202 is positive), the difference Ts between the current time information T and operation history (time information) T' is calculated (step S204), and it is determined whether or not the difference Ts is greater than or equal to an operation history threshold value Tt (step S205). If the difference Ts is greater than or equal to the operation history threshold value Tt (if the determination in step S205 is positive), it is determined that the detailed guidance is necessary (step S206). If the difference Ts is less than the operation history threshold value Tt (if the determination in step S205 is negative), it is determined that the detailed guidance is not necessary (step S207). In this case, simple guidance is set.

In other words, in the information processing device (voice guidance device), according to the present invention, the operation history information means the number N of times each user has performed each operation and the frequency of each operation performed by each user, which is the inverse of the difference Ts of time information.

Also, in the information processing device, according to the present invention, the voice guidance database 107 stores detailed guidance information and simple guidance information for a single operation. For a case where the number of times the user has performed the operation is small or for a case where the number of times the user has performed the operation is large but the frequency of the operation is low, the guidance selection unit 104 selects the detailed guidance information. In contrast, for a case where the number of times the user has performed the operation is large and the frequency of the operation is high, the guidance selection unit 104 selects the simple guidance information.

Moreover, in the information processing device according to the present invention, for a case where the number of times the user has performed the operation is large and the frequency of the operation is high, the guidance selection unit 104 does not select any guidance information. Thus, the voice output unit 105 does not output any guidance information.

When the process determines that guidance is necessary, corresponding guidance is output by voice. For example, voice guidance, such as "By pressing a double-sided copy button, mainly single-sided to double-sided, double-sided to double-sided . . . " is output. Also, the degrees of outputting the voice guidance may be classified depending on the number of times the button has been operated. For example, the output speed of the voice guidance may be increased if the number of times the operation has been performed is large, and the output speed of the voice guidance may be reduced if the number of times the operation has been performed is small. Accordingly, the speed of voice output may be changed in accordance with the number of times the operation has been performed. Also, instead of providing simple guidance, output of all guidance may be eliminated. Moreover, the guidance described above is not necessarily provided in voice. The guidance may be displayed as "characters" on a monitor, a panel, and any other method that would enable practice of the present invention.

The output of such voice guidance is not necessarily limited to the case described above where a copying machine is used. The output of such guidance is also applicable to a facsimile machine, an application program on a personal computer, or any case that would allow practice of the present invention.

Second Embodiment

The guidance provided in the first embodiment is aimed at helping operational procedures. The guidance provided in the second embodiment is aimed at helping when unexpected trouble occurs.

In general, there is a possibility that trouble, such as a paper jams or toner depletion, may occur in copying machines and the like. Voice guidance can be provided for such cases as in the first embodiment. For example, the occurrence of a paper jam can be announced to a user not only by a beep tone or display, but also by voice guidance.

Figure 4:
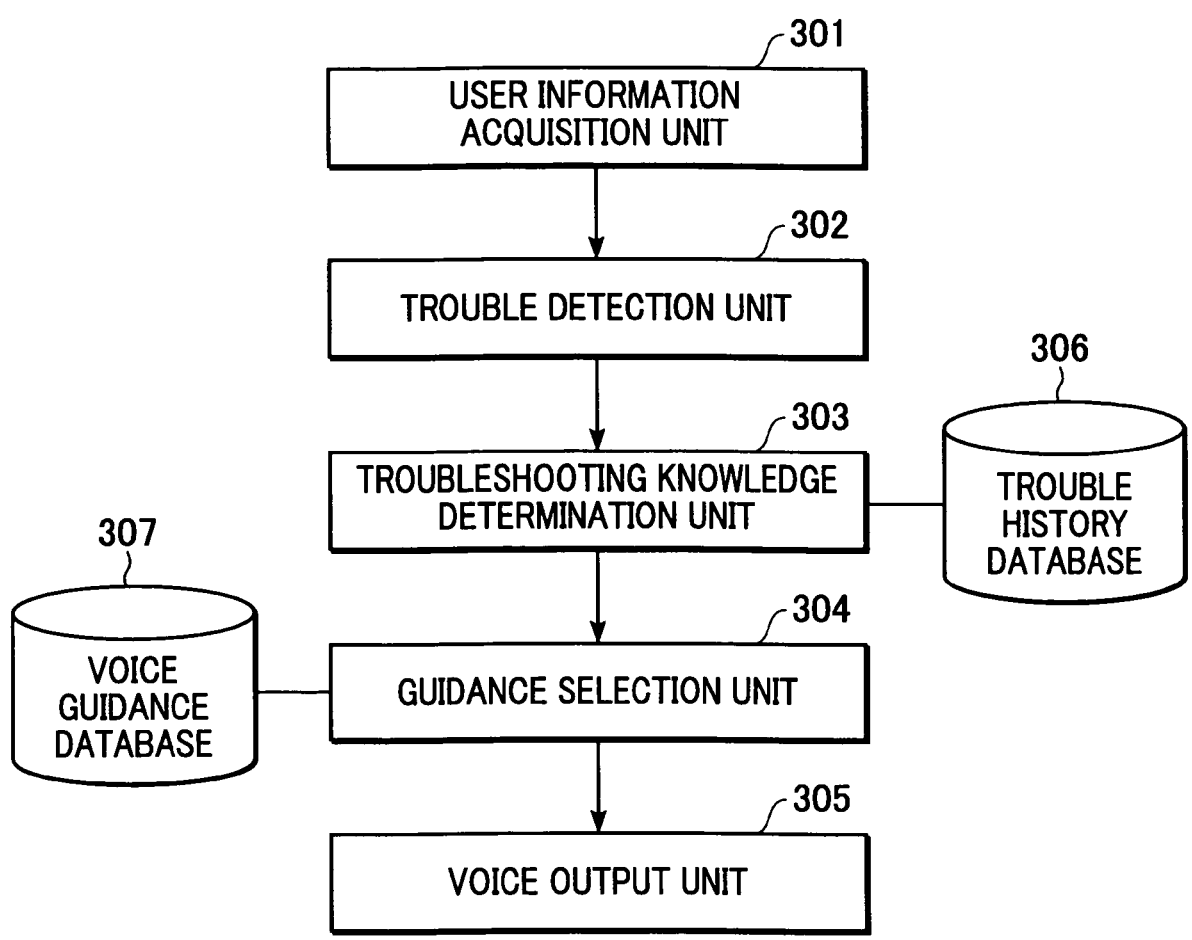
FIG. 4 is a block diagram of the structure of a voice guidance device according to a second embodiment of the present invention.

FIG. 4 is a block diagram of the structure of a voice guidance device according to the second embodiment. Referring to FIG. 4, the voice guidance device includes a user information acquisition unit 301 for acquiring user information, such as a user ID, and for determining which user is operating the voice guidance device; a trouble detection unit 302 for detecting trouble in an apparatus and acquiring trouble information about the type of trouble; a trouble history database 306 for storing trouble history information for a plurality of users; a troubleshooting knowledge determination unit 303 for determining trouble history information and troubleshooting knowledge of the user on the basis of the detected user's trouble information by referring to the trouble history database 306; a voice guidance database 307 for storing a plurality of pieces of voice guidance information for each piece of trouble information; a guidance selection unit 304 for selecting appropriate voice guidance information from the voice guidance database 307 on the basis of the determined user's troubleshooting knowledge; and a voice output unit 305 for outputting the selected voice guidance.

Figure 5:
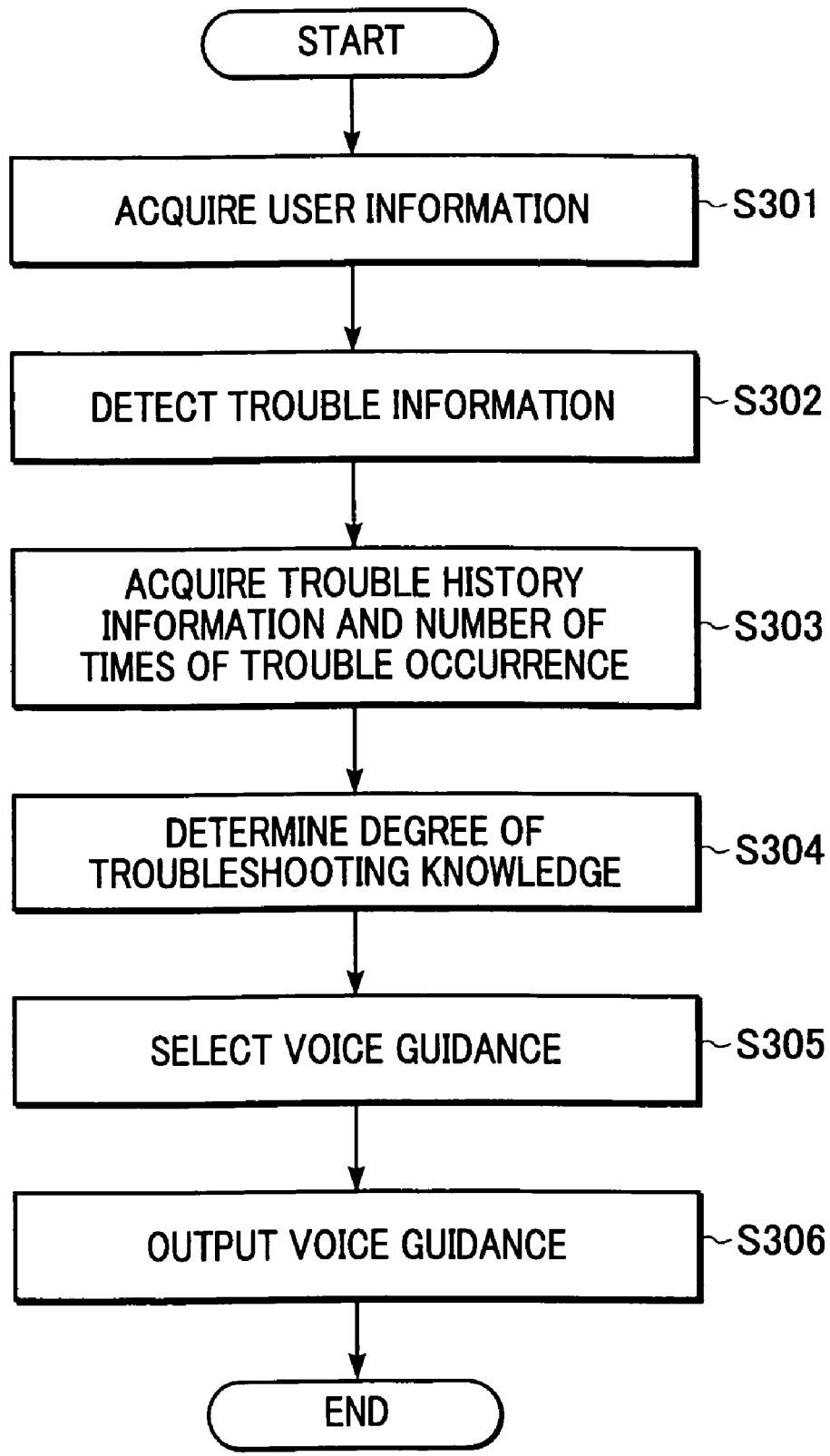
FIG. 5 is a flowchart for explaining the operational procedures performed in the voice guidance device according to the second embodiment of the present invention.

The operational procedures performed in the voice guidance device according to the second embodiment will now be described with reference to a flowchart shown in FIG. 5. A user inputs user information to the voice guidance device. Accordingly, the voice guidance device acquires the user information by the user information acquisition unit 301 (step S301). The user information includes a user ID and the like, and such information allows the user to be identified.

When trouble occurs during the use by the identified user, trouble information, which is information about the details of the trouble and the like, is detected by the trouble detection unit 302 (step S302). The type of trouble detected by the trouble detection unit 302 is transmitted to the troubleshooting knowledge determination unit 303. The troubleshooting knowledge determination unit 303 refers to the trouble history database 306 to acquire trouble history information, the number of times the trouble has occurred, and the like of the identified user on the basis of the user information (step S303).

The troubleshooting knowledge determination unit 303 determines the degree of the user's knowledge about the troubleshooting (step S304), and transmits the results to the guidance selection unit 304. The guidance selection unit 304 selects voice guidance information appropriate for the user by referring to the voice guidance database 307 on the basis of the information transmitted from the troubleshooting knowledge determination unit 303 (step S305). The voice output unit 305 outputs the voice guidance information transmitted from the guidance selection unit 304 (step S306).

In other words, the information processing device (voice guidance device) according to the present invention outputs guidance information for troubleshooting of an information processing apparatus used by a user. Thus, the information processing device includes the user information acquisition unit 301 for identifying the user who is operating the information processing device, the trouble history database 306 for storing trouble history information unique to user, the trouble detection unit 302 for identifying the type of trouble the user experiences, the voice guidance database 307 for storing at least one piece of guidance information on the trouble, the guidance selection unit 304 for selecting appropriate guidance information on the basis of the trouble history information on the trouble unique to the user, and the voice output unit 305 for outputting the selected guidance information.

Also, the information processing device according to the present invention further includes the troubleshooting knowledge determination unit 303 for determining the degree of the user's knowledge about troubleshooting on the basis of the trouble history information of the user, and the guidance selection unit 304 selects appropriate guidance information from the voice guidance database 307 on the basis of the results determined by the troubleshooting knowledge determination unit 303.

The specific operational procedures according to the second embodiment will now be described by way of example of a copying machine.

After the user presses a button to acquire a user ID, guidance for inputting user information is displayed on a touch panel or the like. The input of the user ID and the like by the user using the button or the like allows the copying machine to identify the user. Here, for example, a paper jam occurs during the use of the copying machine by the user.

The number of times the user has experienced the paper jam is determined by referring to the trouble history database 306. The trouble history database 306 includes such information on trouble. Thus, the number of times the user has experienced the trouble and the time when the trouble occurred can be determined, as in determination for the operation.

Figure 6:
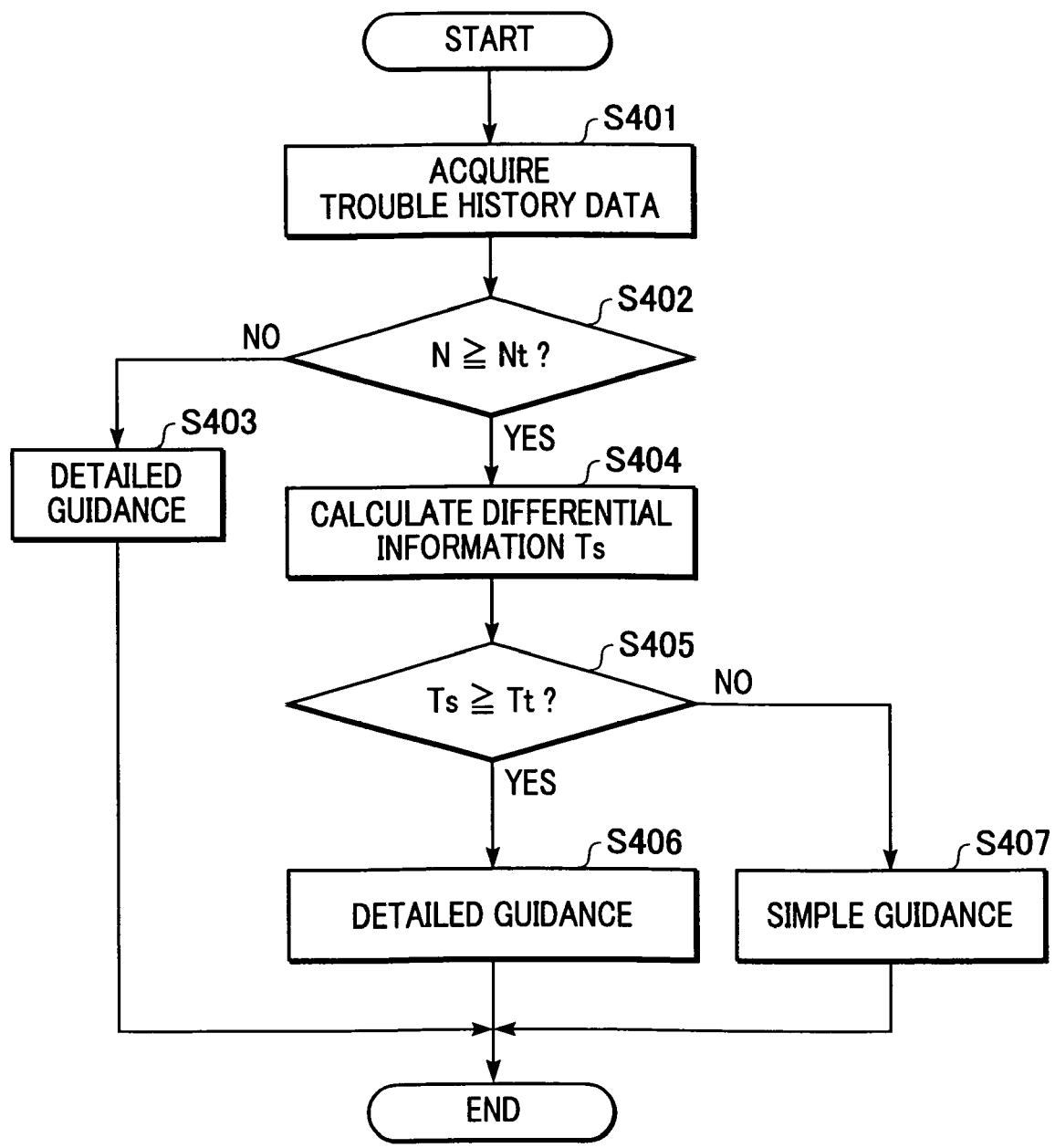
FIG. 6 is a flowchart for explaining a process of a guidance determination method according to the second embodiment of the present invention.

A process of a guidance determination method according to the second embodiment will now be described with reference to a flowchart shown in FIG. 6. Trouble history information is acquired (step S401). Since the number N of times the user has experienced the trouble is known in step S401, it is determined whether or not the number N of times the user has experienced the trouble is greater than or equal to a trouble threshold number Nt (step S402). If the number N of times the user has experienced the trouble is less than the trouble threshold number Nt (if the determination in step S402 is negative), it is determined that detailed guidance for the troubleshooting is necessary (step S403).

If the number N of times the user has experienced the trouble is greater than or equal to the trouble threshold number Nt (if the determination in step S402 is positive), difference Ts between the current time information T and trouble history (time information) T' is calculated (step S404), and it is determined whether or not the difference Ts is greater than or equal to a trouble history threshold value Tt (step S405). If the difference Ts is greater than or equal to the trouble history threshold value Tt (if the determination in step S405 is positive), it is determined that the detailed guidance is necessary (step S406). If the difference Ts is less than the trouble history threshold value Tt (if the determination in step S405 is negative), it is determined that the detailed guidance is not necessary (step S407). In this case, simple guidance is set.

In other words, in the information processing device (voice guidance device) according to the present invention, the trouble history information means the number N of times each user has experienced each kind of trouble and the frequency of experience of each kind of trouble by each user, which is the inverse of the difference Ts of time information.

Also, in the information processing device according to the present invention, the voice guidance database 307 stores detailed guidance information and simple guidance information for troubleshooting for each kind of trouble. For a case where the number of times the user has experienced the trouble is small or for a case where the number of times the user has experienced the trouble is large, but the frequency of the experience is low, the detailed guidance information is selected by the guidance selection unit 304. In contrast, for a case where the number of times the user has experienced the trouble is large and the frequency of the experience is high, the guidance selection unit 304 selects the simple guidance information.

Moreover, in the information processing device according to the present invention, for a case where the number of times the user has experienced the trouble is large and the frequency of the experience is high, the guidance selection unit 304 does not select any guidance information. Thus, the voice output unit 305 does not output any guidance information.

When the process determines that guidance is necessary, corresponding guidance is output by voice. For example, voice guidance, such as "Paper jam. Please open panel 1, and pull lever 1 at the upper left . . . " is output. Also, more detailed guidance may be provided on the basis of information about in what paper feed unit the paper jam occurs.

When simple guidance is provided, simple guidance, such as "Paper jam. Please pull lever in the panel . . . " is output. Also, the degrees of outputting the voice guidance may be classified depending on the number of times the user has experienced the trouble. For example, the output speed of the voice guidance may be increased if the number of times the user has experienced the trouble is large, and the output speed of the voice guidance may be reduced if the number of times the user has experienced the trouble is small. Accordingly, the speed of voice output may be changed in accordance with the number of times the user has experienced the trouble.

Also, instead of providing simple guidance, output of all guidance may be eliminated. Moreover, the guidance described above is not necessarily provided in voice. The guidance may be displayed as "characters" on a monitor, a panel, or by any other manner which would allow practice of the present invention.

The output of such voice guidance is not necessarily limited to the case described above where a copying machine is used. The output of such voice guidance is also applicable to a facsimile machine, an application program on a personal computer, and any other case that would allow practice of the present invention.

Third Embodiment

The previous two embodiments described methods for separately outputting guidance for performing an operational procedure and guidance for troubleshooting a problem. In the present embodiment, these two methods are combined. More specifically, in the information processing device according to the present invention, the guidance for troubleshooting may be provided when the guidance for an operation is provided.

If trouble occurs when operational guidance is output, such as when a user is listening to the operational guidance, the operational guidance is switched to troubleshooting guidance. Accordingly, the guidance for troubleshooting is output in preference to the guidance for an operation. Determination of troubleshooting knowledge and operational knowledge is performed as in the first and second embodiments. The operational guidance is temporarily suspended during the output of the troubleshooting guidance, and the suspended operational guidance is started again after the troubleshooting is completed.

In other words, the information processing device (voice guidance device) according to the present invention outputs guidance information for an operation performed for an information processing apparatus by a user or guidance information for troubleshooting of the information processing apparatus used by the user. The user is identified, and the type of operation performed by the user or the type of trouble the user experiences is identified. Appropriate guidance information is selected from the voice guidance database storing at least one piece of guidance information for each operation and for each kind of trouble on the basis of operation history information on the operation unique to the user or on the basis of trouble history information on the trouble unique to the user, and the selected guidance information is output.

Also, the information processing device according to the present invention determines the degree of the user's knowledge about the operation on the basis of the operation history information on the user or determines the degree of the user's knowledge about the troubleshooting on the basis of the trouble history information on the user, and selects appropriate guidance information from the voice guidance database on the basis of the determined results.

Moreover, in the information processing device according to the present invention, the guidance information for the troubleshooting is output in preference to the guidance information for the operation.

The output of such voice guidance is not necessarily limited to the case described above where a copying machine is used. The output of such voice guidance is also applicable to a facsimile machine, an application program on a personal computer, or any case that would enable practice of the present invention.

Other Embodiments

The present invention is applicable to a system including a plurality of apparatuses, such as a host computer, an interface apparatus, a reader, and a printer. The present invention is also applicable to an apparatus, such as a copying machine or a facsimile machine.

The object of the present invention can also be achieved by supplying a recording medium (or a storage medium) on which program codes of software for realizing the functions of the embodiments described above are recorded to a system or an apparatus and by causing a computer (or a CPU or an MPU) of the system or the apparatus to read and execute the program codes stored in the recording medium. In this case, the program codes themselves read from the recording medium realize functions of the embodiments describe above. Thus, the recording medium that records the program codes constitutes the present invention. The functions of the embodiments described above can be realized not only by executing the read program codes by the computer but also by performing part or all of the actual processing by an operating system (OS) or the like running on the computer on the basis of instructions of the program codes.

The functions of the embodiments described above can also be realized by performing part or all of the actual processing by a CPU or the like arranged in a function extension card of the computer or a function extension unit connected to the computer on the basis of instructions of program codes read from the recording medium after the program codes are written in a memory of the function extension card or the function extension unit.

In a case where the present invention is applied to the recording medium described above, program codes corresponding to the flowcharts described above are stored in the recording medium.

As described above, according to the present invention, appropriate voice guidance is selected from a plurality of pieces of voice guidance and output from a single apparatus in accordance with user's operation history and user's knowledge about the apparatus.

In other words, when the user operates a user interface, such as a button, voice guidance appropriate for the user can be output by referring to the number of times the user has pressed the button and the operation history. Also, when the user experiences trouble, user's knowledge about the troubleshooting is determined from information on the number of times the user has experienced the trouble and the trouble history, thus enabling guidance appropriate for the user to be output. Accordingly, appropriate voice guidance can be provided to a user who operates a button for the first time, a user who experiences trouble for the first time, or a user who does not know operational procedures. Also, for a user who is familiar with the operation or the troubleshooting, voice guidance can be eliminated or simple guidance can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing device included in an information processing apparatus and outputting guidance information for an operation performed for the information processing apparatus by a user, the information processing device comprising:
history information storing means for storing operation history information unique to the user, the operation history information comprises at least the number of times and time information of which the user has performed each operation;
operation identification means for identifying the type of operation performed by the user;
guidance information storing means for storing at least simple guidance information and detailed guidance information which is more detailed than the simple guidance information for a single operation;
selection means for selecting appropriate guidance information from the guidance information storing means on the basis of the operation history information on the operation unique to the user; and
output means for outputting the selected guidance information,
wherein, when the number of times the user has performed the operation is smaller than a first threshold or when the number of times the user has performed the operation is larger than the first threshold but the time difference between the current time information and the time information of the operation history is longer than a second threshold, the selection means selects the detailed guidance information, and
wherein, when the number of times the user has performed the operation is larger than the first threshold and the time difference of the operation is shorter than the second threshold, the selection means selects the simple guidance information.

2. An information processing device according to claim 1, further comprising determination means for determining the degree of the user's knowledge about the operation on the basis of the operation history information on the user, wherein
the selection means selects appropriate guidance information from the guidance information storing means on the basis of the results determined by the determination means.

3. An information processing device according to claim 1, wherein the output means outputs the guidance information by voice.

4. An information processing device according to claim 3, wherein the output speed of the voice guidance is increased when the number of times the operation has been performed is larger than the first threshold, and the output speed of the voice guidance is reduced when the number of times the operation has been performed is smaller then the second threshold.

5. An information processing device included in an information processing apparatus and outputting guidance information for troubleshooting of the information processing apparatus used by a user, the information processing device comprising:
history information storing means for storing trouble history information unique to the user, the trouble history information comprises at least the number of times and time information of which the user has experienced each kind of trouble during the use of the information apparatus;
trouble identification means for identifying the type of trouble the user experiences;
guidance information storing means for storing at least simple guidance information and detailed guidance information which is more detailed than the simple guidance information for troubleshooting for a single kind of trouble;
selection means for selecting appropriate guidance information from the guidance information storing means on the basis of the trouble history information on the trouble unique to the user; and output means for outputting the selected guidance information;

wherein, when the number of times the user has experienced the trouble is smaller than a first threshold or when the number of times the user has experienced the trouble is larger than the first threshold but the time difference between the current time information and the time information of the operation history is longer than a second threshold, the selection means selects the detailed guidance information, and wherein, when the number of times the user has experienced the trouble is larger than the first threshold and the time difference of the operation is shorter than the second threshold, the selection means selects the simple guidance information.

6. An information processing device according to claim 5, further comprising determination means for determining the degree of the user's knowledge about the troubleshooting on the basis of the trouble history information on the user, wherein the selection means selects appropriate guidance information from the guidance information storing means on the basis of the results determined by the determination means.

7. An information processing method for outputting guidance information for an operation performed for an information processing apparatus by a user, the information processing method comprising:

an operation identification step of identifying the type of operation performed by the user;

a selection step of selecting appropriate guidance information from a guidance information storing unit on the basis of operation history information on the operation unique to the user, wherein the storing unit stores at least simple guidance information and detailed guidance information which is more detailed than the simple guidance information for a single operation, wherein the operation history information comprises at least the number of times and time information of which the user has performed each operation; and an output step of outputting the selected guidance information, wherein, when the number of times the user has performed the operation is smaller than a first threshold or when the number of times the user has performed the operation is larger than the first threshold but the time difference between the current time information and the time information of the operation history is longer than a second threshold, the selection means selects the detailed guidance information, and wherein, when the number of times the user has performed the operation is larger than the first threshold and the time difference of the operation is shorter than the second threshold, the selection means selects the simple guidance information.

8. An information processing method according to claim 7, further comprising a determination step of determining the degree of the user's knowledge about the operation on the basis of the operation history information on the user, wherein in the selection step, appropriate guidance information is selected from the guidance information storing unit on the basis of the results determined by the determination step.

9. An information processing method according to claim 7, wherein, in the output step, the guidance information is output by voice.

10. An information processing method for outputting guidance information for troubleshooting of an information processing apparatus used by a user, the information processing method comprising:

a trouble identification step of identifying the type of trouble the user experiences;

a selection step of selecting appropriate guidance information from a guidance information storing unit on the basis of trouble history information on the trouble unique to the user, wherein the storing unit stores at least simple guidance information and detailed guidance information which is more detailed than the simple guidance information for troubleshooting for a single kind of trouble, wherein the trouble history information comprises at least the number of times and time information of which the user has experienced each kind of trouble during the use of the information apparatus; and an output step of outputting the selected guidance information, wherein, when the number of times the user has experienced the trouble is smaller than a first threshold or when the number of times the user has experienced the trouble is larger than the first threshold but the time difference between the current time information and the time information of the operation history is longer than a second threshold, the selection means selects the detailed guidance information, and wherein, when the number of times the user has experienced the trouble is larger than the first threshold and the time difference of the operation is shorter than the second threshold, the selection means selects the simple guidance information.

11. An information processing method according to claim 10, further comprising a determination step of determining the degree of the user's knowledge about the troubleshooting on the basis of the trouble history information on the user, wherein in the selection step, appropriate guidance information is selected from the guidance information storing unit on the basis of the results determined by the determination step.

12. An information processing method for outputting guidance information for an operation performed for an information processing apparatus by a user or outputting guidance information for troubleshooting of the information processing apparatus used by the user, the information processing method comprising:

an identification step of identifying the type of operation performed by the user or identifying the type of trouble the user experiences;

a selection step of selecting appropriate guidance information from a guidance information storing unit on the basis of operation history information on the operation unique to the user or on the basis of trouble history information on the trouble unique to the user, the storing unit stores at least simple guidance information and detailed guidance information which is more detailed than the simple guidance information for troubleshooting for a single kind of trouble, and wherein the storing unit stores the operation history information, wherein the operation history information comprises at least the number of times and time information of which the user has performed each operation, and wherein the trouble history information comprises at least the number of times and time information of which the user has experienced each kind of trouble during the use of the information apparatus; and an output step of outputting the selected guidance information, wherein when the selection is based:

on trouble history, so that when the number of times the user has experienced the trouble is smaller than a first threshold or when the number of times the user has experienced the trouble is larger than the first threshold but the time difference between the current time information and the time information of the operation history is longer than a second threshold, the selection means selects the detailed guidance information, wherein, when the number of times the user has experienced the trouble is larger than the first threshold and the time difference of the operation is shorter than the second threshold, the selection means selects the simple guidance information; or on operation history, so that when the number of times the user has performed the operation is smaller than a first threshold or when the number of times the user has performed the operation is larger than the first threshold but the time difference between the current time information and the time information of the operation history is longer than a second threshold, the selection means selects the detailed guidance information, and wherein, when the number of times the user has performed the operation is larger than the first threshold and the time difference of the operation is shorter than the second threshold, the selection means selects the simple guidance information.

13. An information processing method according to claim 12, further comprising a determination step of determining the degree of the user's knowledge about the operation on the basis of the operation history information on the user or determining the degree of the user's knowledge about the troubleshooting on the basis of the trouble history information on the user, wherein in the selection step, appropriate guidance information is selected from the guidance information storing unit on the basis of the results determined by the determination step.

14. An information processing method according to claim 13, wherein the guidance information for the troubleshooting is output in preference to the guidance information for the operation.

15. An information processing method according to claim 12, wherein the guidance information for the troubleshooting is output in preference to the guidance information for the operation.

16. A program, stored on a medium that can be read by a machine, for causing a computer to output guidance information for an operation performed for an information processing apparatus by a user, the program comprising:

an operation identification step of identifying the type of operation performed by the user;

a selection step of selecting appropriate guidance information from a guidance information storing unit on the basis of operation history information on the operation unique to the user, wherein the storing unit stores at least simple guidance information and detailed guidance information which is more detailed than the simple guidance information for a single operation, wherein the operation history information comprises at least the number of times and time information of which the user has performed each operation; and an output step of outputting the selected guidance information, wherein, when the number of times the user has performed the operation is smaller than a first threshold or when the number of times the user has performed the operation is larger than the first threshold but the time difference between the current time information and the time information of the operation history is longer than a second threshold, the selection means selects the detailed guidance information, and wherein, when the number of times the user has performed the operation is larger than the first threshold and the time difference of the operation is shorter than the second threshold, the selection means selects the simple guidance information.

* * * * *